(12) United States Patent
Kall et al.

(10) Patent No.: US 7,206,589 B1
(45) Date of Patent: Apr. 17, 2007

(54) METHOD AND DEVICE FOR HANDLING A MULTIMEDIA CALL

(75) Inventors: Jan Kall, Espoo (FI); Ahti Muhonen, Espoo (FI); Jouni Salonen, Espoo (FI); Harri Honko, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/018,983

(22) PCT Filed: Jun. 30, 1999

(86) PCT No.: PCT/EP99/04518

§ 371 (c)(1),
(2), (4) Date: Feb. 21, 2002

(87) PCT Pub. No.: WO01/03461

PCT Pub. Date: Jan. 11, 2001

(51) Int. Cl.
*H04Q 7/20* (2006.01)
*H04Q 7/00* (2006.01)
*H04L 12/26* (2006.01)

(52) U.S. Cl. .................. 455/466; 455/445; 455/450; 455/454; 455/455; 370/235; 370/253; 370/335; 370/344; 370/352; 348/6; 348/12; 348/14; 348/118

(58) Field of Classification Search .............. 455/436, 455/67, 69, 437, 442, 443, 454, 455, 522; 370/235, 320, 321, 329, 335, 336, 337, 342, 370/344, 352, 441, 442, 468; 348/6, 12, 14, 348/118; 382/104
See application file for complete search history.

(56) References Cited

FOREIGN PATENT DOCUMENTS

| | | |
|---|---|---|
| EP | 0841 763 A1 | 5/1998 |
| WO | WO 97/09810 | 3/1997 |
| WO | WO 99/52307 | 10/1999 |

OTHER PUBLICATIONS

ITU–T Recommendation H.223: Multiplexing Protocol for Low Bit Rate Multimedia Communication (Mar. 1996); including Annexes (A–D).

ITU–T Recommendation H. 245: Control Protocol for Multimedia Communication (May 1999).

ITU–T Recommendation H. 323: Packet–Based Multimedia Communications Systems (Feb. 1998).

ITU–T Recommendation H. 324: Terminal for Low Bit–Rate Multimedia Communications (Feb. 1998).

*Primary Examiner*—Joseph Feild
*Assistant Examiner*—Julio Perez
(74) *Attorney, Agent, or Firm*—Cohen, Pontani, Lieberman & Pavane

(57) ABSTRACT

The present invention proposes a method for performing a communication between two terminal equipments (TE1, TE2) via at least one communication network (NW1, NW2), said method comprising the steps of establishing (S2) a first connection for a communication signal (V/S) between the two terminal equipments, detecting (S3) a connection changing condition, and, if said connection changing condition is detected, dividing (S4) said communication signal at least into a first signal component (V) and a second signal component (S) and establishing (S5) at least one second connection, said first signal component being transmitted via the first connection and said second signal component being transmitted via the second connection. The present invention proposes also a corresponding device (100) and a corresponding system.

33 Claims, 6 Drawing Sheets

METHOD AND DEVICE FOR HANDLING A MULTIMEDIA CALL

CROSS REFERENCE TO RELATED APPLICATIONS

The present application is a U.S. national stage of application No. PCT/EP99/04518, filed on Jun. 30, 1999.

FIELD OF THE INVENTION

The present invention relates to a method for performing a communication between two terminal equipments via at least one communication network and also relates to a corresponding device and a corresponding system. In particular, the present invention is directed to a method and a corresponding device and a corresponding system for handling a multimedia call in different communication networks.

BACKGROUND OF THE INVENTION

In recent and future communication systems the ability to perform a multimedia call becomes more and more important. An example of such a multimedia call is a videotelephony call. Such kind of communication requires e.g. high data transfer rates and a high quality of service (QoS) level. Therefore, specific services and equipment are to be defined.

Telecommunication systems and networks being adapted to perform a videotelephony call are for example the Integrated Services Digital Network (ISDN), General Packet Radio Service (GPRS) in the Global System for Mobile communication (GSM) or the Universal Mobile Telecommunications System (UMTS). Furthermore, in combination with a respective system, it is possible to use a circuit switched communication or a packet data communication.

For defining a multimedia communication several recommendations for example by the International Telecommunications union (ITU) have been made, e.g. the H.245, the H.324 and the like, which describe services, protocols, terminals etc. to be used for a multimedia call such as a videocall.

In the case of the above mentioned videocall, it is possible to transfer data between two terminals (mobile or fixed) via a communication network of one of the above mentioned types. The terminals or terminal equipments (such as mobile stations or videotelephones) can be in the same communication network or in different communication networks. The videocall is performed via a bi-directional connection between the two terminal equipments. Said connection initiated by one of said terminal equipments is for example an end-to-end H.324 connection which is carried for example on a UMTS data bearer.

In view of the high amount of data, the used network has to provide a corresponding high data transfer rate. Said data rate is also to be ensured for a data exchange between two different networks when the two terminal equipments are within respective different networks (for example UMTS->ISDN, UMTS A->UMTS B and the like).

However, there are some drawbacks. During a normal connection (e.g. packet data communication or circuit switched communication) between the two terminal equipments being in the same network such as a UMTS network, the quality of service (i.e. of the connection) can get worse and a good or even adequate communication can not be guaranteed. Moreover, when a handover is to be made for at least one of the terminal equipments from a network adapted to perform a videocall such as a UMTS network to a network with lower capacity (and therefore for example not able to perform a videocall) where such high data rates used for a multimedia call are not supported, the connection is interrupted. In the case that the lower capacity network handed over to is able to perform a videocall, at least the quality of service is getting worse.

Document EP-A-0 841 763 A1 describes a method of controlling physical radio resources.

Furthermore, in document WO-A-97/09810, a method for multirate data communications in one communication network is described.

SUMMARY OF THE INVENTION

Therefore, it is an object of the present invention to provide a method and a corresponding device for handling a multimedia call such as a videocall in different communication networks, which are free from the above mentioned drawbacks. Furthermore, a corresponding device is to be provided.

According to the present invention, this object is achieved by a method for performing a communication between two terminal equipments, said method comprising the steps of establishing a first connection for a communication signal between the two terminal equipments via a first communication network, characterized by the steps of detecting a connection changing condition, said changing condition being a handover or one of said terminal equipments to a second communication network having lower communication resources, and, if said connection changing condition is detected, dividing said communication signal at least into a first signal component and a second signal component, at least said second signal component being suitable for transmission in said second communication network and establishing at least one second connection between said terminal equipments, said second signal component being transmitted via said second connection to said one of said terminal equipments.

Additionally, this object is achieved, for example, by a method for performing a packet data multimedia communication between two terminal equipments, said method comprising the steps of establishing at least a first connection and a second connection for communication signal components between the two terminal equipments via a first communication network, characterized by the steps of detecting a connection changing condition, said changing condition being a handover of one of said terminal equipments to a second communication network having lower communication resources, and, if said connection changing condition is detected, canceling one of said at least first and second connections transmitting one communication signal component and maintaining the connection via the other one of said at least first and second connections transmitting the other signal component, wherein said other signal component is suitable for transmission in said second communication network.

Furthermore, the present invention proposes a device for performing a communication between two terminal equipments, said device comprising first establishing means for establishing a first connection for a communication signal between the two terminal equipments via a first communication network, characterized by comprising detecting means for detecting a connection changing condition, said changing condition being a handover of one of said terminal equipments to a second communication network having lower communication resources, dividing means for dividing said communication signal at least into a first signal component and a second signal component, if said detecting means detects said connection changing condition, at least said second signal component being suitable for transmission in said second communication network, and second establishing means for establishing at least one second connection between said terminal equipments, said second signal component being transmitted via said second connection to said one of said terminal equipments.

Additionally, the present invention proposes a device for performing a packet data multimedia communication between two terminal equipments, said device comprising establishing means for establishing at least a first connection and a second connection for communication signal components between the two terminal equipments via a first communication network, characterized by comprising detecting means for detecting a connection changing condition, said changing condition being a handover of one of said terminal equipments to a second communication network having lower communication resources, and canceling means for canceling one of said at least first and second connections transmitting one communication signal component while maintaining the connection via the other one of said at least first and second connections transmitting the other signal component, wherein said other signal component is suitable for transmission in said second communication network.

Moreover, the present invention proposes a system in which a communication between two terminal equipments is performed, said system is adapted to establish a first connection for a communication signal between the two terminal equipments via a first communication network, characterized in that the system is adapted to detect a connection changing condition, said changing condition being a handover of one of said terminal equipments to a second communication network having lower communication resources, and, if said connection changing condition is detected, divide said communication signal at least into a first signal component and a second signal component, at least said second signal component being suitable for transmission in said second communication network and establish at least one second connection between said terminal equipments, said second signal component being transmitted via said second connection to said one of said terminal equipments.

Additionally, the present invention proposes a system in which a packet data multimedia communication between two terminal equipments is performed, said system being adapted to establish at least a first connection and a second connection for communication signal components between the two terminal equipments via a first communication network, characterized in that said system is adapted to detect a connection changing condition, said changing condition being a handover of one of said terminal equipments to a second communication network having lower communication resources, and, if said connection changing condition is detected, cancel one of said at least first and second connections transmitting one communication signal component and maintain the connection via the other one of said at least first and second connections transmitting the other signal component, wherein said other signal component is suitable for transmission in said second communication network.

Advantageous further developments of the present invention are as set out in the respective dependent claims.

According to the present invention, the proposed method and/or device and/or system allow to establish at least one second connection between the two terminal equipments or between a respective terminal equipment and a respective network, respectively. By using said second connection parallel to the first one, it is possible to transmit one component (for example a video component) of the original communication signal via the first connection and another component (for example a speech component) of the original communication signal via the second connection. Advantageously, the video component can use the complete capacity of the first connection which improves the quality and robustness according for example H.324. On the other hand, the speech component transmitted via the second connection is not affected by the video component which also improves quality. Said second connection can be a connection similar to the first one (e.g. a UMTS multimedia call connection) or just a (lower capacity) speech call connection. It is also possible to use both connection as a data bearer and split and combine the data as it seems fit between the two connections.

Additionally, in case of a handover, in particular in a handover to a network with lower capacity or which is unable to perform a videocall (for example some GSM networks), by dropping the video component (i.e. the corresponding connection), the multimedia call or at least the speech call can be maintained. In case of a connection between e.g. a UMTS network and a GSM network each using different protocol types, the speech component can be easily transcoded by a corresponding element. At a handover back to the UMTS network, the multimedia call can be reestablished in the original way.

Preferred embodiments of the invention are described herein below in detail by way of example with reference to the accompanying drawings.

DESCRIPTION OF PREFERRED EMBODIMENTS

Figure 1A:
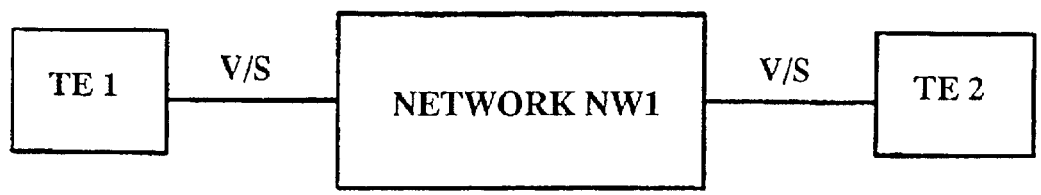
FIGS. 1A, 1B and 1C show connection states between two terminals.

In FIG. 1A a connection state for a multimedia call in a most general case is shown. A first terminal equipment TE 1 is connected to a second terminal equipment TE 2 via a communication network NW 1. Said network is for example an UMTS network adapted to perform a multimedia communication. Through the connection a multimedia signal V/S (e.g. a videotelephony call) is transmitted between said terminal equipments.

Figure 1B:
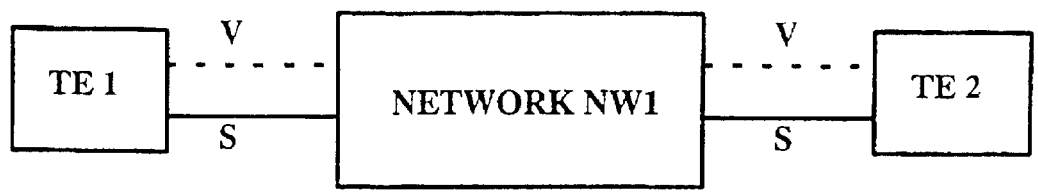

FIG. 1B illustrates one implementation of the present invention. In this case, for example the quality of the communication connection within the network NW 1 is getting worse. Therefore the original multimedia signal V/S is divided into at least two components V and S each of which transmitted via a separate connection. The at least one new connection is established similar to the original connection. It is either of the same type (for example an UMTS multimedia call connection) or of a different type (for example a normal speech call connection). The selection of the connection type used for the second connection can be made subscriber specific, dependant on network resources available or fixed (i.e. always the same type such as the above mentioned UMTS connection).

The two signal components V and S can be of the same type (split and combine the data stream of the original signal V/S in accordance with network requirements), i.e. the connections are used as similar data bearers. On the other hand, there can be formed different component types such as video and speech component.

Optionally, the first connection transmitting for example the video signal component V from the network NW 1 to the second terminal equipment TE 2 can be canceled depending on network resources.

The above described case is also possible when the two terminal equipments are within different networks both of them adapted to perform a multimedia call on the same level. It is obvious, that corresponding connections are to be established between the networks in such a case.

It is to be noted, that for deciding whether a second connection (or even more connections) is to be established e.g. because of a deterioration of quality the connection is to be monitored. This monitoring can be done either by the network (e.g. by a mobile switching center MSC) and/or by the terminal equipment. Also the decision of the establishment of said second connection can be made by either the network or the terminal equipment.

Figure 1C:
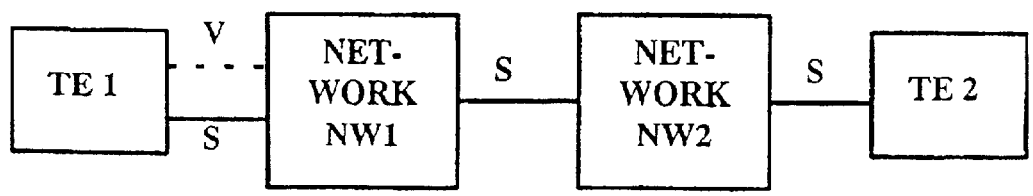

In FIG. 1C another implementation of the present invention is shown. Here, a case of a handover to a second network NW 2, i.e. the second terminal equipment TE 2 is moved into a coverage area of said second network, is described. The second network NW 2 is for example a GSM network which has not adequate resources for transmitting such a high amount of data as used in a multimedia call. Therefore, when recognizing this circumstances, after establishing the second connection and dividing the original multimedia signal V/S into the two components V and S, the first connection and hence the first (video) component is dropped. Only the second component S, for example the speech component, is forwarded (or handed over) by the first network to the second user equipment. Here, in particular in a circuit switched type connection, when one component is dropped (e.g. the video component V), it can be necessary to notify this change in communication to the terminal equipments TE1, TE2 to guarantee an uninterrupted communication.

In this case, it is also possible that the format of the multimedia signal, i.e. the format of the second signal component S, is to be changed in accordance with the respective second network NW 2 such as a GSM network. For example, when the first network NW 1 uses H.324, the corresponding signal component S is to be transcoded for the second network NW 2.

In the above described cases (FIG. 1B, 1C), when the reason for the establishment of the second connection and the division of the multimedia signal V/S (i.e. a changing condition) is not present anymore, for example due to a back-handover from a GSM network to a UMTS network, the original connection state (one connection, one signal V/S) can be reestablished. However, it is also possible to maintain the two connections.

It should be noted, that it is also possible, e.g. in the case of a packet data transfer, that only a part of the data packets with corresponding contents will be transferred via the communication connection according to the present invention.

In the following, with reference to FIGS. 2A and 2B, connection paths and specific network elements used therein in case of the above described handover are illustrated. It is to be noted, that here the paths are shown in the direction from the lower capacity network to the higher capacity network. However, it is easy to understand that the same procedure is executed in the opposite direction.

Figure 2A:
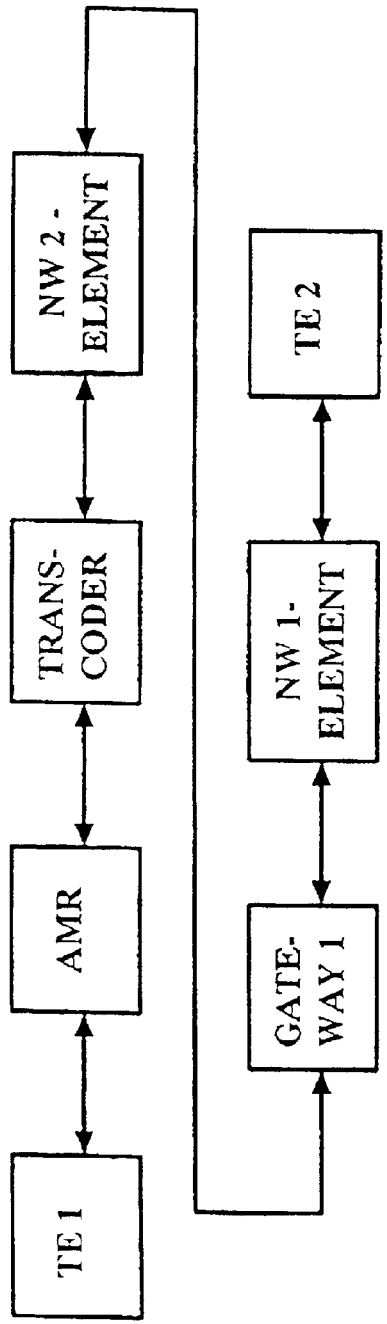
FIGS. 2A, 2B show connection paths with elements used in a communication according to the invention.

In FIG. 2A one example of a connection according to the present invention is shown, in particular in case of a handover to a lower capacity network. This type of handover requires a videocodec/speech codec (encoder/decoder) adapter in the connection path. The situation before said handover is as shown in FIG. 1A. After the handover, as illustrated in FIG. 2A, the connection is as follows. The signals are forwarded from a terminal equipment TE 1 via an advanced multirate speech coder AMR to a transcoder. The AMR is a new type of speech coder used for GSM systems, which is adapted to vary its coding rate in accordance with the data (speech) to be transmitted. The transcoder is adapted to encode and decode for example the speech signal into corresponding data formats. The data is then transmitted to a network element of the (second) network NW 2, for example to a mobile switching center MSC. Here, a pulse code modulation PCM is used as a coding method for transmitting data such as speech via the networks. One method used for coding is for example A-law. Then, the data is forwarded to another network NW 1 via a gateway 1. Said gateway is also a transcoder used for changing the format of the data from the PCM A-law format into another format, for example a H.324 format. Optionally, a further advanced multirate speech coder can be introduced. Via the network NW 2 (for example a network applicable according to H.324) data is transmitted to the called terminal equipment TE 2.

Figure 2B:
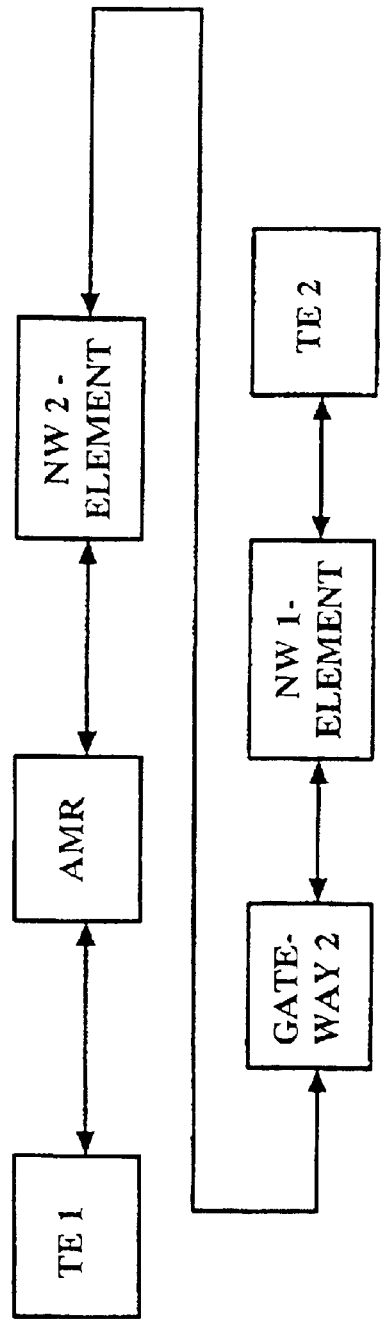

FIG. 2B shows a similar case to FIG. 2A. Here, a tandemfree operation is supported, i.e. the transcoder is within the network itself. In contrast to the above described case with reference to FIG. 2A, the gateway 2 simply adepts the AMR speech signal format to a H.324 format, which can be also correspond to an AMR.

As mentioned above, it is also possible to use the present invention in case of a deterioration of quality or to guarantee service continuity. For this application, it is for example requested to switch off the video connection or video channel V, i.e. the corresponding data bearer. The speech component S (AMR speech) is for example encapsulated in a H.223 multiplexing protocol data stream. In this case, it is possible to reach a lower bit error rate and a higher quality. Furthermore, also a dedicated speech service with AMR speech coding and the like can be requested.

Figure 3:
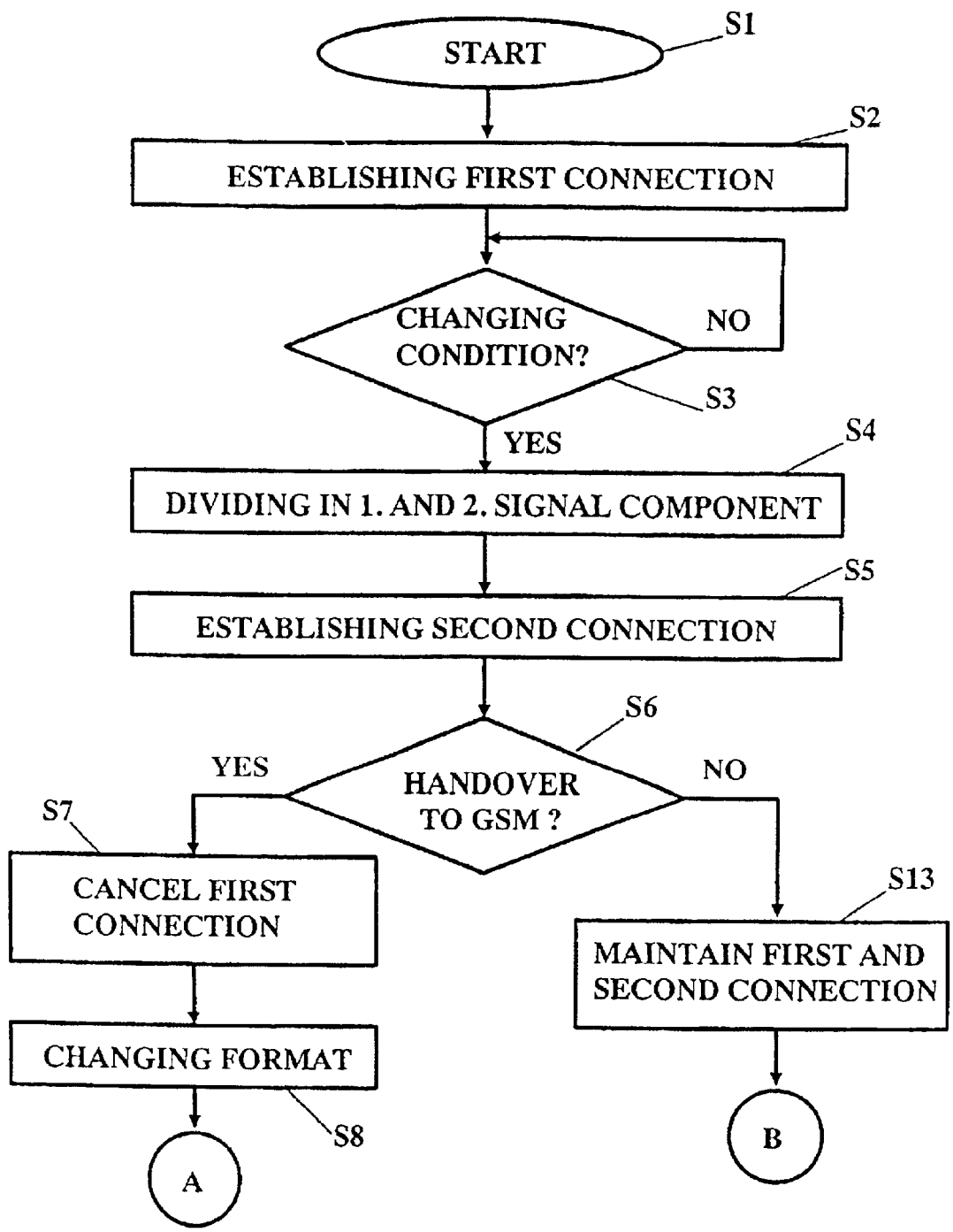
FIG. 3 is a flowchart illustrating a method for handling a communication according to the invention.

With reference to FIG. 3, a method for performing a communication between the two terminal equipments TE1, TE2 according to the invention is described. When the procedure is started (step S1), first the first connection for the multimedia signal V/S between the two terminal equipments TE1, TE2 via the first communication network is established in step S2. When in step S3 a connection changing condition (e.g. because of a deterioration of quality or due to a handover, as described above) is detected, the process proceeds to step S4, otherwise said step 53 is repeated.

In step S4, after detection of said connection changing condition, the multimedia signal V/S is divided at least into a first signal component V and a second signal component S, which are in the case of a videotelephony call a video component and a speech component, respectively. Also, in step S5, at least one second connection is established, either on request by a respective terminal equipment TE 1, TE 2 or by the network itself. Now the first signal component V may be transmitted via the first connection and the second signal component S may be transmitted via the second connection.

In a step S6, it is decided, whether the changing condition detected in said detecting step S3 is a handover to a lower capacity network. If YES, in step 57 the first connection including the transmitted first signal component V (for example the video component as the component requiring the most resources) is canceled. Furthermore, in step 58, the format of the still transmitted signal component S may be changed or transcoded, if required.

Figure 4:
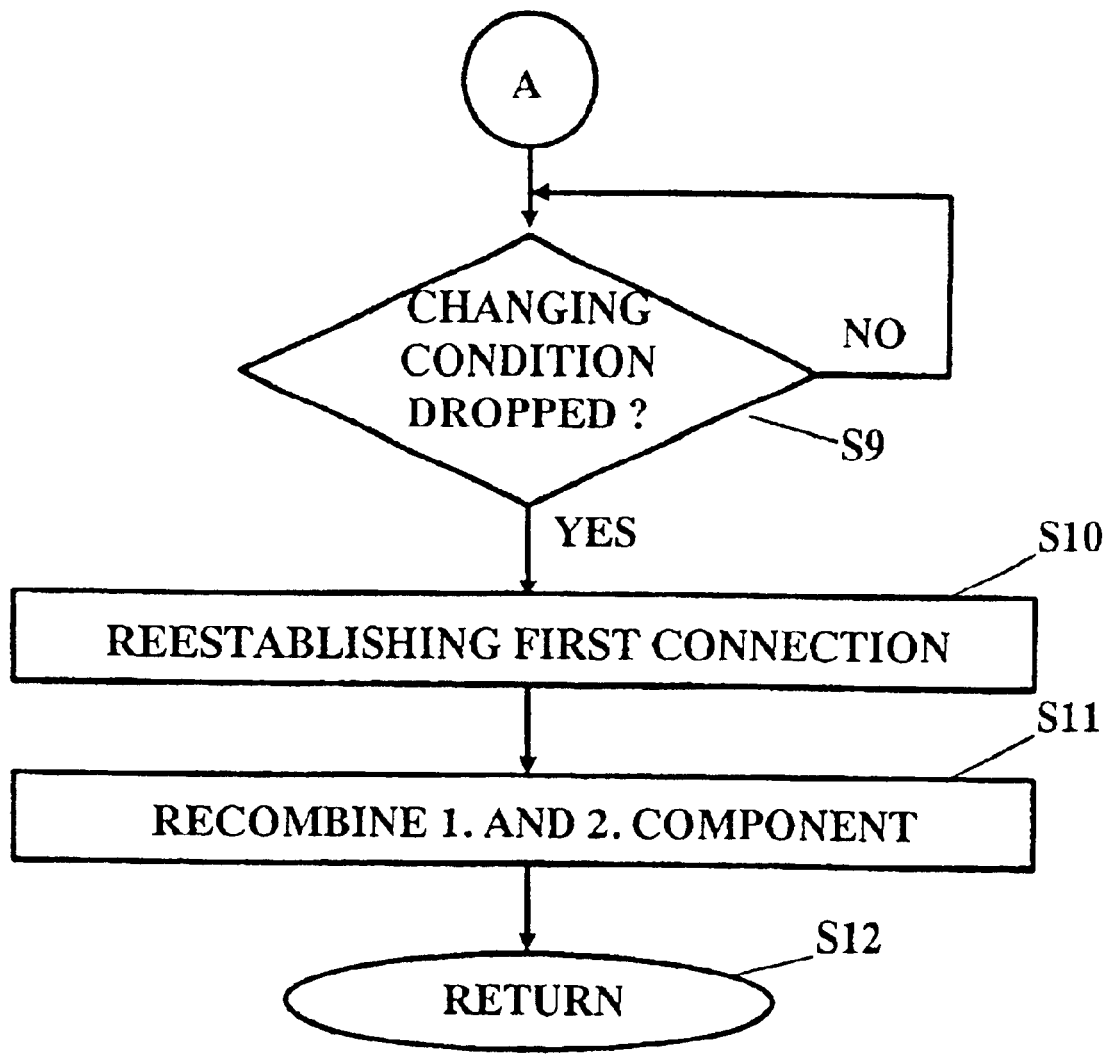
FIG. 4 is a flowchart illustrating a method for handling a communication according to the invention.

With reference to FIG. 4, in the following the case is described where the changing condition concerning a handover is canceled. When detecting in step S9 that e.g. the handover to a lower capacity network is finished and a handover to a higher capacity network (at least at an adequate capacity level to perform a multimedia call) is performed, in step S10 the first connection canceled in said canceling step S7 is reestablished. This reestablishment can be initiated by a terminal equipment TE 1, TE 2 or by the network (for example by the mobile switching center MSC). Now, the multimedia communication can be performed via the first connection transmitting the first signal component V and the second connection transmitting the second signal component S, as described above. However, it is also possible to recombine both components V and S to the original multimedia signal V/S (step S11). Then the second connection can be canceled or still used to transmit one part of said multimedia signal V/S split thereof.

Figure 5:
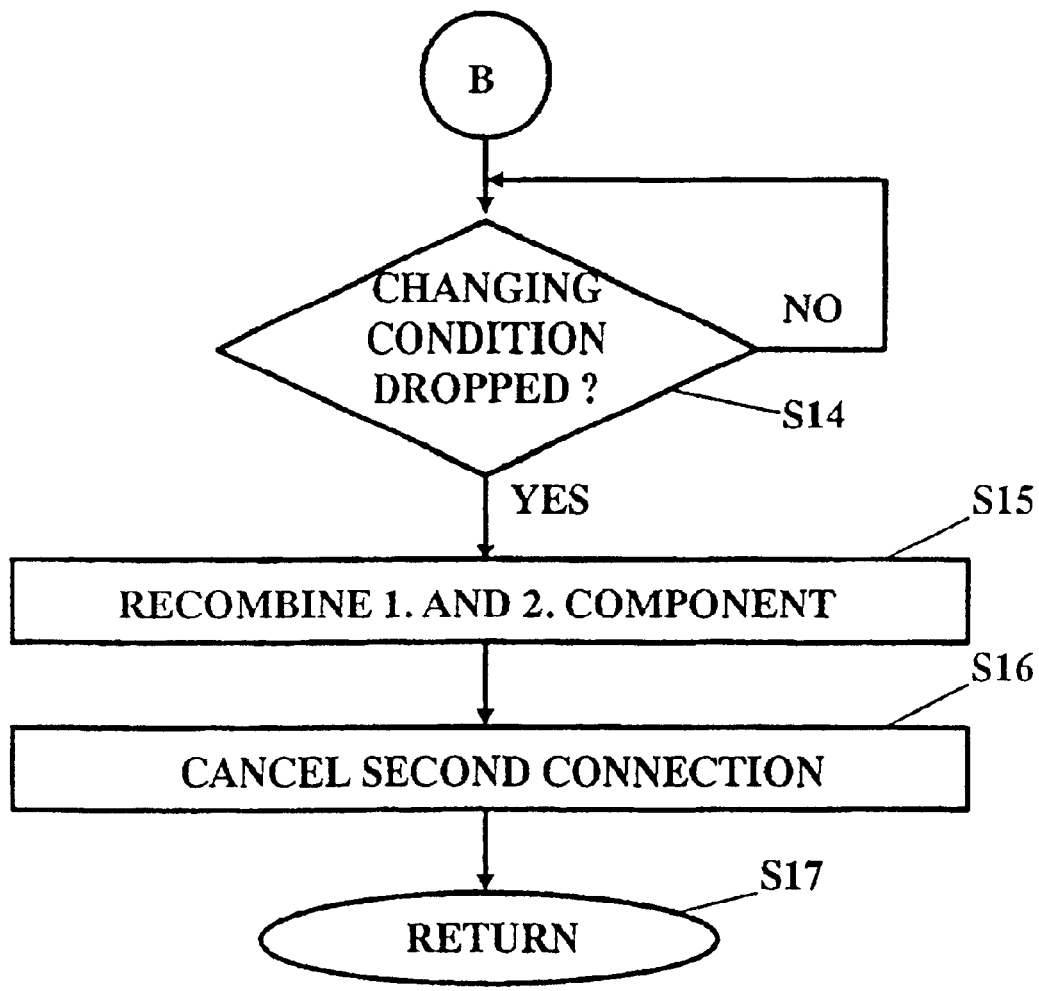
FIG. 5 is a flowchart illustrating a method for handling a communication according to the invention.

With reference to FIGS. 3 and 5, now the case is described where no handover is to be performed but the changing condition detected in said detecting step S3 is for example a lack of quality.

In the above mentioned case, in step S13, the multimedia communication is performed by maintaining the first and the second connection transmitting the first and the second signal component V, S. Similar to the above described handover, when the canceling of the changing condition is detected in step S14 in FIG. 4 (i.e. the quality can be guaranteed again or because of a user request), in step S15 the original multimedia signal V/S is rebuilt from the first signal component V and the second signal component S. The second connection is canceled in step S16 the rebuilt multimedia signal V/S is again transmitted via the first connection. Optionally, the second connection can be maintained, as described above, for transmitting one signal part.

Figure 6:
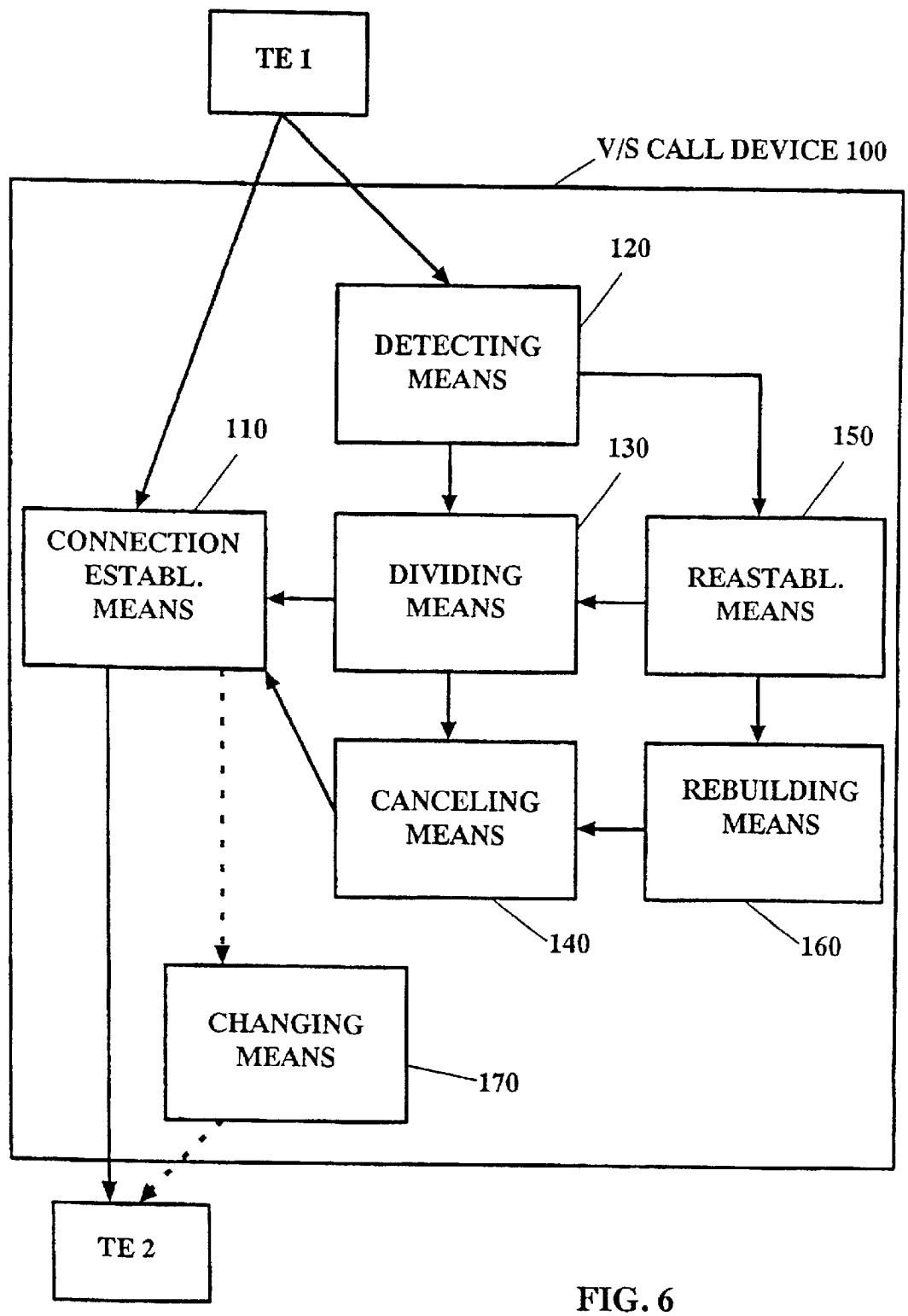
FIG. 6 is a block circuit diagram for illustrating a device for handling a communication according to the invention.

In FIG. 6, a device 100 (V/S call device) adapted to perform a handling of a multimedia call in accordance with the present invention is shown. For said multimedia call, the first connection for a multimedia signal V/S between the two terminal equipments TE1, TE2 via the network is established by a connection establishing means 110. When a detecting means 120 detects a connection changing condition such as a handover to a lower capacity network or a deterioration of quality, a dividing means 130 divides said multimedia signal V/S at least into a first signal component V (for example a video component) and a second signal component S (for example a speech component). The establishing means 110 establishes at least one second connection, wherein said first signal component V may be transmitted via the first connection and said second signal component S may be transmitted via the second connection.

Additionally, a canceling means 140 is adapted to cancel the first connection transmitting the first signal component V, for example in the case of a handover to a lower capacity network NW2 as described above. Then the communication is performed only via the second connection transmitting the second signal component S.

A reestablishing means 150 is adapted to reestablish the first connection canceled by said canceling means 140, when said changing condition is dropped (detected for example by said detecting means 120). Now the communication may be performed via the first connection transmitting the first signal component V and the second connection transmitting the second signal component S. It is also possible, that the original multimedia signal V/S is rebuilt by a rebuilding means 160 from the first and the second signal component V and S. In this case, said communication may be performed via the first and second connection both transmitting one part of the multimedia signal V/S (for example split). Another solution is to cancel the second connection by said canceling means 140. Then the multimedia call is only performed via the first connection transmitting the rebuilt multimedia signal V/S.

In the case of a handover, when the lower capacity network uses for example a different protocol type, a changing means 170 is used for changing or transcoding the respective communication signal (for example the speech component S) from one format into the respective other format used in the respective networks NW 1, NW 2.

It should be noted, that the device 100 can be part of the corresponding networks and or of the terminal equipments.

As mentioned above, it is possible to maintain both parallel connections even if the changing condition is dropped. However, it should be mentioned, that this solution increases costs as more resources are required. Therefore, in general the second connection is only activated if required (low quality, preparation of handover or the like) and canceled when not needed anymore.

A user performing a call using the present invention will be charged according to the number (and/or capacity) of the currently established connections. However, when a connection or connections are for example handed over from one network (e.g. NW1) to another network (e.g. NW2), it is obvious that charging will be stopped in the first network and started in the second network handed over to. Conditions for the charge can be subscriber specific or according to usual network negotiations.

It may be possible to enhance current in-band negotiation protocols to handle the above described parallel call feature according to the present invention. The data bearer should be able to carry H.245 signaling.

The parallel (speech call) connection can be established for example before, during or after a handover, e.g. to a lower capacity network. Furthermore, the present invention can be used in a handover within for example one UMTS network (intra-UMTS handover), in a user initiated handover or in a user initiated change of connection type (bearer re-negotiation).

In particular, when the present invention is used in a packet data multimedia communication for example in a H.323 system, it is very easy to implement. Since in a H.323 system each multimedia signal component (e.g. speech and video) has own separate bearers (in uplink and downlink direction), a diversion of the components or even a switch off of one component (i.e. of the corresponding bearers) is easy to perform. This allows an improvement of quality or a continuation of the multimedia call, for example only by speech, when a lack of capacity of the used network as a changing condition occurs (e.g. due to a handover or other reasons, as described above). When the changing condition is dropped (e.g. handover back to the higher capacity network or the like), it is also easy to reestablish the original communication paths only by switching on the previously cancelled bearers.

The present invention proposes a method for performing a communication between two terminal equipments TE1, TE2 via at least one communication network NW1, N2, said method comprising the steps of establishing S2 a first connection for a communication signal V/S between the two terminal equipments, detecting S3 a connection changing condition, and, if said connection changing condition is detected, dividing S4 said communication signal at least into a first signal component V and a second signal component S and establishing S5 at least one second, said first signal component being transmitted via the first connection and said second signal component being transmitted via the second connection. The present invention proposes also a corresponding device 100 and a corresponding system.

It should be understood that the above description and accompanying figures are merely intended to illustrate the present invention by way of example only. The preferred embodiments of the present invention may thus vary within the scope of the attached claims.

What is claimed is:

1. A method for performing a communication between two terminal equipments (TE1, TE2),
    said method comprising the steps of:
    establishing (S2) a first connection for a communication signal (V/S) between the two terminal equipments (TE1, TE2) via a first communication network (NW1),
    characterized by the steps of:
    detecting (S3) a connection changing condition, said changing condition being a handover of one of said terminal equipments (TE2) to a second communication network (NW2) having lower communication resources, and,
    if said connection changing condition is detected, dividing (S4) said communication signal (V/S) at least into a first signal component (V) and a second signal component (S), at least said second signal component being suitable for transmission in said second communication network (NW2) and
    establishing (S5) at least one second connection between said terminal equipments (TE1, TE2), said second signal component (S) being transmitted via said second connection to said one of said terminal equipments (TE2).

2. A method according to claim 1, further comprising the steps of:
    canceling (S7) the first connection transmitting the first signal component (V), and
    maintaining the communication via the second connection transmitting the second signal component (S).

3. A method according to claim 2, further comprising the steps of:
    reestablishing (S10) the first connection canceled in said canceling step (S7), when said changing condition is dropped (S9), and
    performing the communication via the first connection transmitting the first signal component (V) and the second connection transmitting the second signal component (S).

4. A method according to claim 2, further comprising the steps of:
    reestablishing (S10) the first connection canceled in said canceling step (S7), when said changing condition is dropped (S9),
    rebuilding (S11) the communication signal (V/S) from the first signal component (V) and the second signal component (S), and
    performing the communication via the first connection transmitting the communication signal (V/S) rebuilt in said rebuilding step (S11).

5. A method according to claim 1, further comprising the steps of:
    maintaining (S13) the communication via the first and the second connection transmitting the first and the second signal component (V, S),
    rebuilding (S15) the communication signal (V/S) from the first signal component (V) and the second signal component (S),
    canceling (S16) the second connection, and
    transmitting the rebuilt communication signal (V/S) via the first connection.

6. A method according to claim 1, wherein said communication signal (V/S) is a videotelephony signal.

7. A method according to claim 6, wherein said first signal component (V) is a video signal component and said second signal component (S) is a speech component.

8. A method according to claim 1, wherein said handover is performed when at least one of said terminal equipments (TE1, TE2) leaves a communication area of a first communication network (NW1) and enters a communication area of a second communication network (NW2).

9. A method according to claim 8, wherein communication signals of a first format are used in said first communication area (NW1) and communication signals of a second format are used in said second communication area (NW2),
    said method further comprising the step of
    changing (S8) the communication signal (V/S) or the first signal component (V) or the second signal component (S) from one of said first or second format into the respective other of the first or second format.

10. A method for performing a packet data multimedia communication between two terminal equipments (TE1, TE2),
    said method comprising the steps of:
    establishing at least a first connection and a second connection for communication signal components (V, S) between the two terminal equipments (TE1, TE2) via a first communication network (NW1),
    characterized by the steps of:
    detecting a connection changing condition, said changing condition being a handover of one of said terminal equipments (TE2) to a second communication network (NW2) having lower communication resources, and,
    if said connection changing condition is detected, canceling one of said at least first and second connections transmitting one communication signal component (V) and maintaining the connection via the other one of said at least first and second connections transmitting the other signal component (S), wherein said other signal component (S) is suitable for transmission in said second communication network (NW2).

11. A method according to claim 10, further comprising the steps of:
    reestablishing the connection canceled in said canceling step, when said changing condition is dropped, and performing the communication via the at least first and second connections transmitting the communication signal components (V, S).

12. A device for performing a communication between two terminal equipments (TE1, TE2),
said device (100) comprising:
first establishing means (110) for establishing a first connection for a communication signal (V/S) between the two terminal equipments (TE1, TE2) via a first communication network (NW1),
characterized by comprising:
detecting means (120) for detecting a connection changing condition, said changing condition being a handover of one of said terminal equipments (TE2) to a second communication network (NW2) having lower communication resources,
dividing means (130) for dividing said communication signal (V/S) at least into a first signal component (V) and a second signal component (S), if said detecting means (120) detects said connection changing condition, at least said second signal component being suitable for transmission in said second communication network (NW2), and
second establishing means (110) for establishing at least one second connection between said terminal equipments (TE1, TE2), said second signal component (S) being transmitted via said second connection to said one of said terminal equipments (TE2).

13. A device (100) according to claim 12, comprising canceling means (140) for canceling the first connection transmitting the first signal component (V), said communication being maintained via the second connection transmitting the second signal component (S).

14. A device according to claim 13, comprising reestablishing means (150) for reestablishing the first connection canceled by said canceling means (140), when said chancing condition is dropped, said communication being performed via the first connection transmitting the first signal component (V) and the second connection transmitting the second signal component (S).

15. A device (100) according to claim 13, comprising reestablishing means (150) for reestablishing the first connection canceled by said canceling means (140), when said changing condition is dropped, and
rebuilding means (160) for rebuilding the communication signal (V/S) from the first and the second signal component (V, S), said communication being performed via the first connection transmitting the communication signal (V/S) rebuilt by said rebuilding means (160).

16. A device according to claim 12, wherein the communication is maintained via the first and the second connection transmitting the first and the second signal component (V, S),
said device (100) comprising
rebuilding means (160) for rebuilding the communication signal (V/S) from the first and the second signal component (V, S),
canceling means (140) for canceling the second connection, said communication being performed via the first connection transmitting the communication signal (V/S) rebuilt by said rebuilding means (160).

17. A device according to claim 12, wherein said communication signal (V/S) is a videotelephony signal.

18. A device according to claim 17, wherein said first signal component (V) is a video signal component and said second signal component (S) is a speech component.

19. A device according to claim 12, wherein said handover is performed when at least one of said terminal equipments (TE1, TE2) leaves a communication area of a first communication network (NW1) and enters a communication area of a second communication network (NW2).

20. A device according to claim 19, wherein communication signals of a first format are used in said first communication area (NW1) and communication signals of a second format are used in said second communication area (NW2),
said device (100) comprising
changing means (170) for changing the communication signal (V/S) or the first signal component (V) or the second signal component (S) from one of said first or second format into the respective other of the first or second format.

21. A device for performing a packet data multimedia communication between two terminal equipments (TE1, TE2),
said device comprising:
establishing means for establishing at least a first connection and a second connection for communication signal components (V, S) between the two terminal equipments (TE1, TE2) via a first communication network (NW1),
characterized by comprising:
detecting means for detecting a connection changing condition, said changing condition being a handover of one of said terminal equipments (TE2) to a second communication network (NW2) having lower communication resources, and
canceling means for canceling one of said at least first and second connections transmitting one communication signal component (V) while maintaining the connection via the other one of said at least first and second connections transmitting the other signal component (S), wherein said other signal component (S) is suitable for transmission in said second communication network (NW2).

22. A device according to claim 21, further comprising:
reestablishing means for reestablishing the connection canceled by said canceling means, when said changing condition is dropped, said packet data communication being performed via the at least first and second connections transmitting the communication signal components (V, S).

23. A system in which a communication between two terminal equipments (TE1, TE2) is performed,
said system is adapted to:
establish (S2) a first connection for a communication signal (V/S) between the two terminal equipments (TE1, TE2) via a first communication network (NW1),
characterized in that the system is adapted to
detect (S3) a connection changing condition, said changing condition being a handover of one of said terminal equipments (TE2) to a second communication network (NW2) having lower communication resources, and,
if said connection changing condition is detected, divide (S4) said communication signal (V/S) at least into a first signal component (V) and a second signal component (S), at least said second signal component being suitable for transmission in said second communication network (NW2) and
establish (S5) at least one second connection between said terminal equipments (TE1, TE2), said second signal component (s) being transmitted via said second connection to said one of said terminal equipments (TE2).

24. A system according to claim 23, further adapted to:

cancel (S7) the first connection transmitting the first signal component (V), and maintain the communication via the second connection transmitting the second signal component (S).

25. A system according to claim 24, further adapted to:

reestablish (S10) the canceled first connection, when said changing condition is dropped (S9), and perform the communication via the first connection transmitting the first signal component (V) and the second connection transmitting the second signal component (S).

26. A system according to claim 24, further adapted to:

reestablish (S10) the first connection canceled in said canceling step (S7), when said changing condition is dropped (S9), rebuild (S11) the communication signal (V/S) from the first signal component (V) and the second signal component (S), and perform the communication via the first connection transmitting the communication signal (V/S) rebuilt in said rebuilding step (S11).

27. A system according to claim 23, further adapted to:

maintain (S13) the communication via the first and the second connection transmitting the first and the second signal component (V, S), rebuild (S15) the communication signal (V/S) from the first signal component (V) and the second signal component (S), cancel (S16) the second connection, and transmit the rebuilt communication signal (V/S) via the first connection.

28. A system according to claim 23, wherein said communication signal (V/S) is a videotelephony signal.

29. A system according to claim 28, wherein said first signal component (V) is a video signal component and said second signal component (S) is a speech component.

30. A system according to claim 23, further adapted to perform said handover when at least one of said terminal equipments (TE1, TE2) leaves a communication area of a first communication network (NW1) and enters a communication area of a second communication network (NW2).

31. A system according to claim 30, wherein communication signals of a first format are used in said first communication area (NW1) and communication signals of a second format are used in said second communication area (NW2), said system is adapted to change (S8) the communication signal (V/S) or the first signal component (V) or the second signal component (S) from one of said first or second format into the respective other of the first or second format.

32. A system in which a packet data multimedia communication between two terminal equipments (TE1, TE2) is performed, said system being adapted to:

establish at least a first connection and a second connection for communication signal components (V, S) between the two terminal equipments (TE1, TE2) via a first communication network (NW1), characterized in that said system is adapted to detect a connection changing condition, said changing condition being a handover of one of said terminal equipments (TE2) to a second communication network (NW2) having lower communication resources, and, if said connection changing condition is detected, cancel one of said at least first and second connections transmitting one communication signal component (V) and maintain the connection via the other one of said at least first and second connections transmitting the other signal component (S), wherein said other signal component (S) is suitable for transmission in said second communication network (NW2).

33. A system according to claim 32, further adapted to:

reestablish the connection canceled in said canceling step, when said changing condition is dropped, and perform the communication via the at least first and second connections transmitting the communication signal components (V, S).

* * * * *